Figure 7:
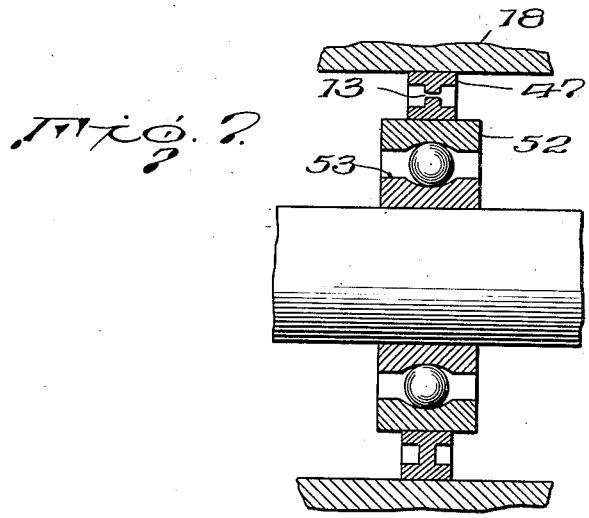

Sept. 23, 1941.    R. J. S. PIGOTT    2,256,783
BEARING
Filed June 19, 1940    2 Sheets-Sheet 1
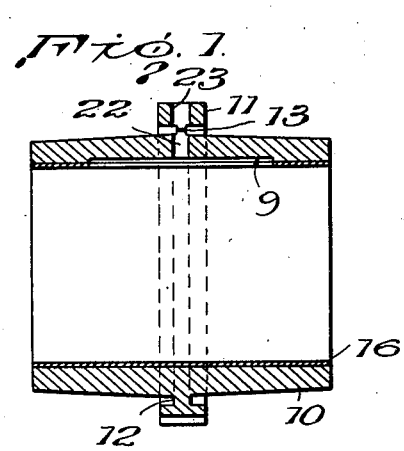
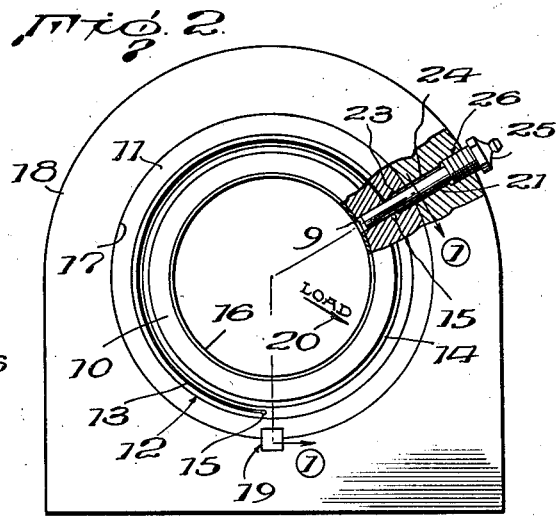
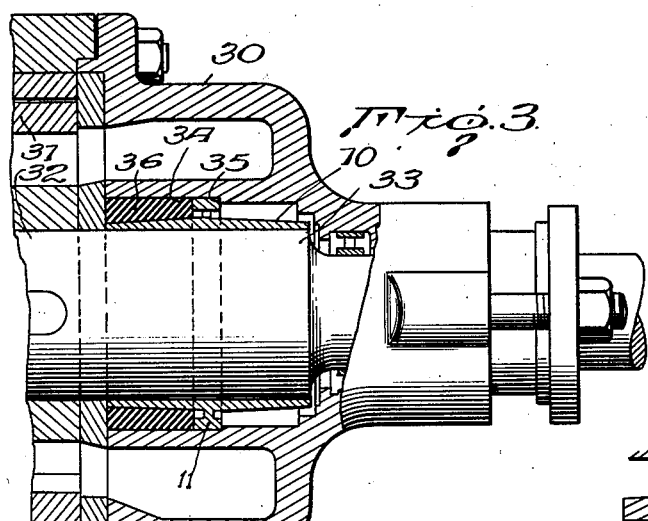
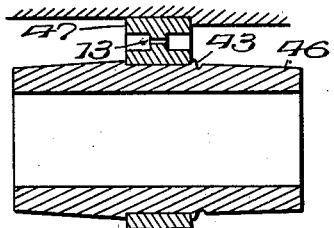
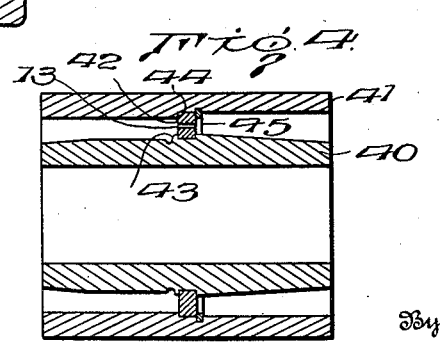
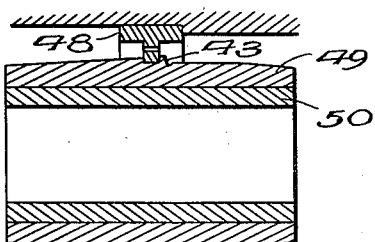
Inventor
R. J. S. Pigott,
By A. M. Houghton
his Attorney Sept. 23, 1941.   R. J. S. PIGOTT   2,256,783
BEARING
Filed June 19, 1940    2 Sheets-Sheet 2

Inventor
R.J.S. Pigott
By A. M. Houghton
his Attorney

Patented Sept. 23, 1941

2,256,783

UNITED STATES PATENT OFFICE 2,256,783

BEARING

Reginald J. S. Pigott, Pittsburgh, Pa., assignor to Gulf Research & Development Company, Pittsburgh, Pa., a corporation of Delaware Application June 19, 1940, Serial No. 341,369

9 Claims. (Cl. 308—26)

This invention or discovery relates to bearings; and it comprises a flexible or self-aligning bearing for rotary members including a floating annular bearing member rotatably supporting the rotary member, a supporting member and a thin arcuate resilient web, of arc angle substantially less than 180 degrees, connecting the bearing member and the supporting member and being stiff in the plane perpendicular to the axis of the bearing member and yieldable in other planes; all as more fully hereinafter set forth and as claimed.

There is a need in many kinds of machinery for flexible or self-aligning sleeve bearings, that is sleeve bearings which will adjust themselves to misalignment of shafting, etc. Self-alignment is relatively easy to provide where plenty of room is available, such as in the case of overhead shafting where the bearing sleeve proper can be mounted on horizontal pivots or the like. But in certain machinery, such as some types of rotary pumps, such simple expedients cannot be employed, especially when heavy bearing stresses are present.

Misalignment of bearings results in uneven distribution of the lubricating film, with the possibility of metal-to-metal contact. Difficulties due to misalignment are acute in the running-in period, and in general, using rigid bearings, a newly installed bearing must not be subjected at once to full load, to avoid excessive localized wear due to possible misalignment.

In ordinary practice with sleeve bearings, a bearing shell having a close fit of the order of 0.001 per inch of diameter over the shaft is assembled with a press fit into a bearing support piece or housing or is tightly clamped in a support member such as a pillow block. The bearings thus assembled are rigidly fixed in the member into which they have been assembled, and their alignment depends on the accuracy of mounting the support members on at least a third member. In the case of a pump, this alignment may depend on even pull-down of a gasket between the support piece and a third member such as the pump casing. Alignment under any circumstances similar to those described above will be inexact to a greater or lesser degree.

According to the present invention there is provided a flexible bearing of improved construction, capable of carrying very heavy bearing loads and of little more complexity than an ordinary plain bearing. The new bearing is of such character as to allow ready installation and replacement without special equipment, and to facilitate application of cooling media when necessary. The bearing is very compact and is readily lubricated and is well adapted for combination with sealing means, in pumps and the like, without affecting the self-aligning feature. Flexibility is achieved without providing any parts which rub against each other; there is no chance for the bearing to freeze as happens in some types of spherical-seat flexible bearings due to the impracticability of maintaining a lubricating film between the loaded spherical surfaces which are not in continuous unidirectional motion with respect to each other. Another feature of the invention is that a bearing support is provided which is flexible in a plane including the axis of rotation but is rigid in the direction of load, so that the shaft position, or in the case of geared machinery the center spacing of the gears, can be accurately maintained while flexure under load is provided. The bearing of the present invention requires no running-in period under subnormal load. It can be operated at full load from the first. Furthermore it is capable of carrying substantially more bearing load than rigid bearings of the same dimensions; about 30 per cent more in typical cases.

These advantages are attained by the provision of a bearing comprising in the main embodiment a shaft-carrying sleeve or the equivalent, a concentric mounting annulus, and a thin annular supporting web between the sleeve and the mounting annulus. The web is arcuately slotted through an arc of 240 degrees or thereabouts so as to leave only a segmental supporting connection or web which acts as a resilient hinge. The bearing is mounted so that the load direction is along the central axis of the arcuate flexible connection. The web is proportioned to be rigid in the plane perpendicular to the axis of rotation, and flexible in the plane which includes the axis of rotation and the load direction.

In the accompanying drawings there are shown more or less diagrammatically five examples of specific embodiments of apparatus within the purview of the invention. In the drawings, Fig. 1 is a view in central vertical section of one form of flexible bearing of unitary construction, taken along line 1—1 of Fig. 2;

Fig. 2 is an end view of the bearing of Fig. 1, installed in a fixed supporting structure;

Fig. 3 is a vertical sectional view of the bearing of Fig. 1 installed in a gear pump and showing sealing means for the bearing, Figs. 4, 5 and 6 are vertical sectional views of three modified forms of bearings in which the annular supporting portion is separate from the sleeve portion; and Fig. 7 is a view in central vertical section of a form of the invention like that of Fig. 5 but applied to an antifriction bearing.

Referring to the drawings and more especially Figs. 1 and 2, a bearing shell or sleeve 10 is provided, of approximately cylindrical shape with a slightly enlarged waist as shown, and having a mounting ring 11 integrally joined to the shell by an annular web 12 of reduced thickness. These elements are conveniently turned or cast from a single piece of material. The web is arcuately slotted at 13 through an angle of 240° or thereabouts, as shown, so as to leave only a segment 14 of arc 120° joining the shell to the ring. The slot terminates at enlarged eyes 15 to avoid cracking at these points. The shell can be a plain bearing or can be fitted with a Babbitt metal or other bearing-metal lining as shown at 16. The mounting ring is installed as a tight fit in a bore 17 in a supporting structure 18, shown diagrammatically, which may take the form of a part of a machine, a pillow block, etc. depending on the particular installation. A key 19 restrains the ring against rotation.

In installing the bearing, the supporting segment 14 is disposed in the direction of load, as apparent from Fig. 2 wherein an arrow 20 indicates the direction of load with respect to the bearing. When the bearing is used on overhead shafting web 14 is disposed with its central axis vertical. The bearing carries a shaft (cf. Fig. 3) in conventional manner. The bearing gives as solid a support for the shaft load as do conventional rigid bearings, but the shell is free to flex in a plane which includes the axis of rotation and the center line of segment 14, so that misalignment or bending of the shaft under load are compensated for.

The bearing is conveniently lubricated through the agency of a tube 21, making a push fit in a bore 22 through sleeve 10 and delivering lubricant to a longitudinal slot 9 in the shell. The tube extends through a slightly larger bore 24 in the supporting structure, where it is fastened to and retained by a lubrication fitting 25 screwed in the structure at 26. The arrangement shown permits the bearing to flex through sufficiently wide limits without disturbing the lubrication connection. In removing the bearing, fitting 25 is first unscrewed and lifted out together with the tube. In some installations the bearing works in an oil bath and the lubrication tube is not necessary.

The bearing shell assemblage can be made of any suitable material, and is often embodied in bronze or in steel if a Babbitt lining is provided as described. The bearing assemblage is very easy to construct, to install and to replace and is adapted for fully automatic mass production.

The bearing is readily adapted for sealing against passage of fluids, without appreciably affecting the flexibility. Fig. 3 shows the bearing of Figs. 1 and 2 embodied in a pump of the external-internal gear type (see for example Pigott Patents 2,053,919 and 2,055,587) having a chambered casing 30 enclosing a pumping ring gear 31 and pinion 32 mounted on a shaft 33. Mounting annulus 11 is press-fitted in a bore 34 in the casing, resting against a shoulder 35, and a resilient or elastic sealing material 36 is interposed between the bore and the sleeve 10 as shown. The sealing material can be rubber, synthetic rubbers, "Thiokol" (reaction products of organic dihalides and water-soluble polysulfides) or other plastic substance of character suited to the fluids handled by the pump. Fluid pressures developed in the pump keep the sealing material in tight engagement with the bearing shell, web and bore.

While the unitary construction of elements 10, 11 and 12 is advantageous, it is sometimes desirable to make these elements separately. Figs. 4, 5 and 6 show such modifications.

In Fig. 4, a bearing sleeve 40 is joined to a mounting sleeve 41 through a ring 42, slotted at 13 as in Fig. 2, rolled or staked in place on the sleeve at 43 and retained against a shoulder 44 in the mounting sleeve by a snap ring 45. The mounting shell is pressed into the pillow block, etc. support, not shown. This type of construction permits the several parts of the bearing to be made of different materials. Ring 42 can be spring steel for example.

Fig. 5 shows a construction wherein a bearing shell 46 carries a combined web and mounting ring 47, slotted at 13 as in Fig. 1, the mounting ring being shown retained in a bore as in Fig. 3.

In Fig. 6 a mounting ring 48 of T-section is provided, and the bearing shell 49 is shown fitted with a micarta lining 50. The bearing is otherwise similar to that of Fig. 5.

While my bearing is of particular utility with plain sleeve type bearing surfaces, it can, of course, be utilized with antifriction bearing elements such as roller bearings, with oil-less type bearing surfaces, etc. Fig. 7 shows the arrangement of Fig. 5 adapted to a ball bearing. The race 52 of a ball bearing 53 of conventional type is tightly fitted in an annulus 47 slotted at 13 (cf. Fig. 4) which in turn is carried in a fixed support 18.

The relative proportions of the various parts of the bearing, e. g. the ratio of the length of the bearing sleeve to the diameter, are determined somewhat by the requirement of the particular installation, but the proportions indicated in the drawings are of quite general utility.

What I claim is:

1. In a bearing for rotary members, an annular bearing means for a rotary member, a relatively thin-walled mounting annulus surrounding the bearing means and arcuately slotted through the wall continuously throughout an arc greater than 180° so as to leave an arcuate flexible supporting web, and support means engaging and supporting the mounting annulus.

2. A bearing for rotary members adapted for installation in a bored support, comprising an annular bearing member for supporting the rotary member, and a relatively thin-walled annulus surrounding the bearing member and joined thereto and arcuately slotted through the wall continuously through an arc greater than 180° so as to leave an arcuate flexible supporting web, the exterior of the annulus being of such diameter as to fit said bored support.

3. The bearing of claim 1 wherein the mounting annulus and the annular bearing means are of unitary construction.

4. The bearing of claim 1 wherein the mounting annulus is separate from the annular bearing means and is in tight engagement therewith.

5. The bearing of claim 1 comprising in addition annular resilient sealing means disposed between the bearing means, the support means and the mounting annulus.

6. A bearing for rotary members comprising an annular bearing member for supporting the rotary member, a concentric supporting annulus, a thin sector-shaped member supporting the bearing member from the annulus, the arc of such sector being substantially less than 180° and the bearing member being otherwise separate from the annulus, said bearing member having a radial bore therethrough beyond the ends of the sector and the supporting annulus having a coaxial larger bore therethrough, and a lubricant-supply tube fitting relatively closely in the bearing member bore and extending out through the supporting annulus bore.

7. A flexible bearing for rotary members comprising an annular member rotatably supporting the rotary member, a fixed support and a resilient member joining the annular member to the support, relatively thin in the direction of the axis of rotation and relatively thick in a plane perpendicular thereto, and extending over only a portion of the circumference of the annular member less than 180 degrees, whereby the resilient member yields to stresses tending to bend said annular member in a plane which includes the member and the axis of rotation, but resists stresses in the plane perpendicular to the axis of rotation.

8. A flexible bearing for rotary members comprising an annular bearing member supporting the rotary member for rotation, a support surrounding the bearing member and spaced therefrom and a thin web of arc substantially less than 180° joining the bearing member and the support, the bearing member being otherwise separate from the support.

9. A flexible self-aligning bearing for rotary members comprising an annular member rotatably supporting the rotary member, an annular fixed support and a resilient annular member of an angle substantially less than 180 degrees, joining the annular member to the support, relatively thin in the direction of the axis of rotation and relatively thick in a plane perpendicular thereto, whereby the resilient member yields to stresses tending to bend said member in a plane which includes the member and the axis of rotation, but resists stresses in the plane perpendicular to the axis of rotation.

REGINALD J. S. PIGOTT.